Nov. 10, 1925. 1,560,582
F. H. KAGARISE
SAFETY BRAKE LOCK AND BRAKE LOCKING DEVICE FOR AUTOMOBILES AND TRUCKS
Filed Dec. 17, 1923
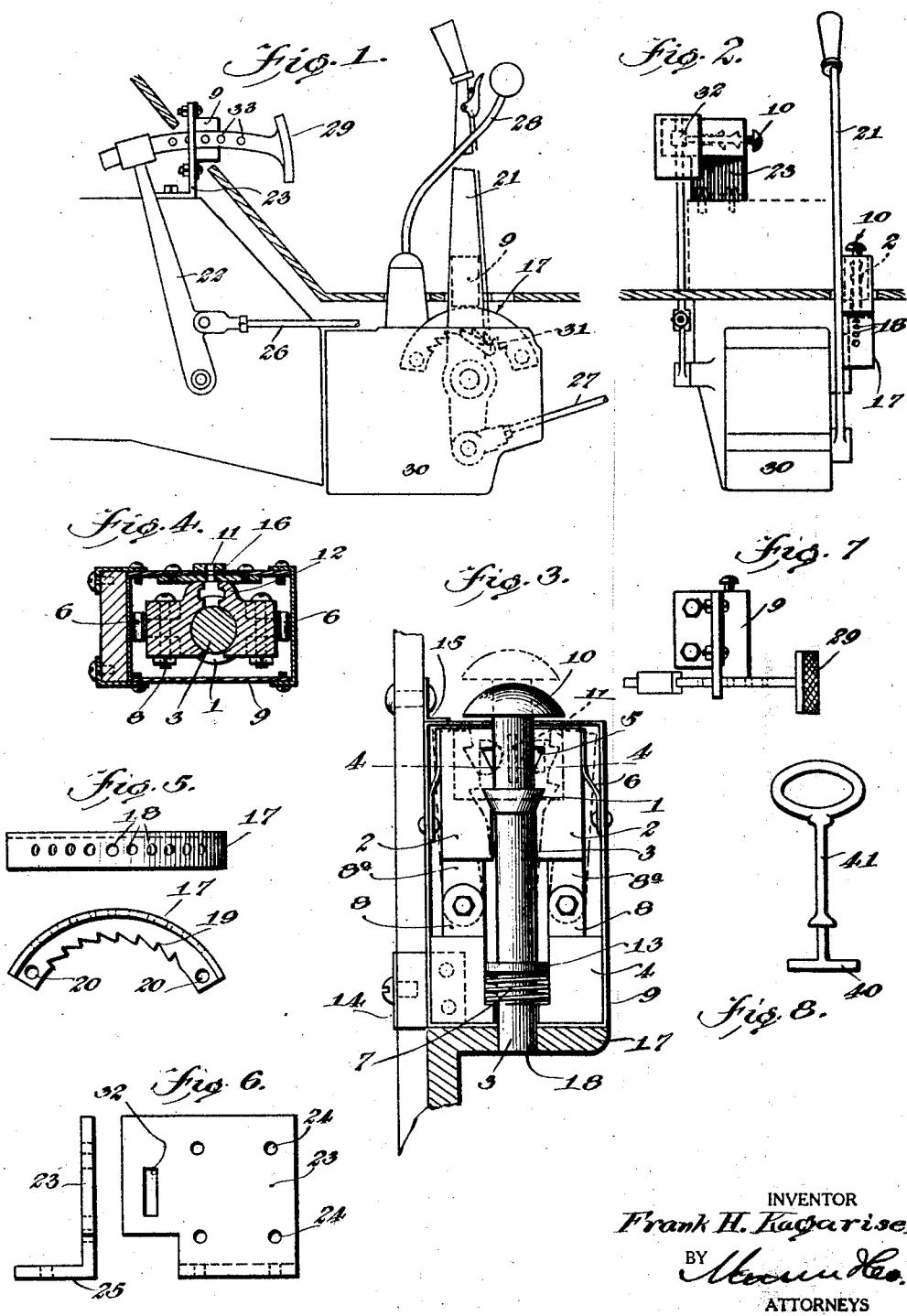
INVENTOR
Frank H. Kagarise,
BY
ATTORNEYS Patented Nov. 10, 1925.

1,560,582

UNITED STATES PATENT OFFICE.

FRANK H. KAGARISE, OF SHARPSVILLE, PENNSYLVANIA.

SAFETY BRAKE LOCK AND BRAKE-LOCKING DEVICE FOR AUTOMOBILES AND TRUCKS.

Application filed December 17, 1923. Serial No. 681,170.

*To all whom it may concern:*

Be it known that I, FRANK H. KAGARISE, citizen of the United States, residing at Sharpsville, in the county of Mercer and State of Pennsylvania, have invented a Safety Brake Lock and Brake-Locking Device for Automobiles and Trucks, of which the following is a specification.

My invention relates to new and useful improvements in means for locking levers of either the emergency or foot brake type or both, and has for an object to prevent the stealing of automobiles and trucks.

Another object is to prevent removal of wheels to which brake drums are attached.

I attain these objects by mechanism illustrated in the accompanying drawing in which Fig. 1 represents side view of foot and emergency brakes.

Fig. 2 represents end view of brakes with floor boards removed.

Fig. 3 represents a view of lock in locked position with side cover removed.

Fig. 4 represents a section shown through line 4—4 on Fig. 3.

Fig. 5 represents a detail of emergency brake ratchet for locking of emergency brake.

Fig. 6 represents bracket used for connecting foot brake lock to rear motor housing.

Fig. 7 represents plan view of foot brake.

Fig. 8 represents key.

Similar numerals refer to similar parts throughout the several views.

The lock consists of the casing 9 which when used with the emergency brake is secured to lever 21 by angle clips 14 and 15 riveted to the lever just above the brake sector which includes the curved shelf 17 provided with the radial perforations 18, and the ratchet bar 19, which is to be secured to the automobile by the bolt openings 20.

In the bottom of casing 9 is located a block 4 having a central bore to first receive a locking bolt 3, and a counterbore to receive a collar 13 on said bolt 3; between this collar 13 and the bottom of the counterbore, a coiled spring 7 surrounds said bolt its tendency being to normally force the bolt upwardly to passive position. Extending upwardly from the block 4 diametrically opposite each other are the perforated ears 8 to which are pivoted the lower ends of the leaves 8ª extending from the dogs 2 which are grooved in their inner faces to conform to the shape of the bolt 3.

The bolt 3 is provided with an annular flared shoulder 1 and to receive this shoulder the dogs 2 are provided on their inner channeled faces with transverse flared or wedge-shaped notches 5, and which maintain the bolt in locked or unlocked position, this action being rendered automatic by the springs 6 secured at one end to the casing and bearing inwardly at their other ends against the free ends of the dogs.

The outer end of bolt 3 passes through the end of casing 9 that is distant from the sector 17 and is enlarged to form a knob 10 by which it is pressed by the foot of the driver to force the bolt through the holes 18 of the sector against the action of spring 7 to lock the same together.

The pawl 31 is of the usual type used in connection with the ratchet bar 19 of this class of brakes, the pawl being operated by the usual rod, and spring hand grip. 27 is the ordinary brake rod pivotally connected at its forward end to emergency brake lever 21.

The dogs 2 are provided at one side with lugs 12 which are grooved in their opposing faces to form a seat for the wards 40 of the key 41 shown in Fig. 8. To the inside of the casing 9 opposite the grooved lugs 12 is secured a plate having a slot in alinement with the opening between these lugs and in this wall of the casing, this slot constituting the keyhole of the lock. A keyhole escutcheon 16 provided with the slit 11 is secured to the outer face of the casing as shown in Figure 4.

When the device is not in use, the bolt occupies the position indicated by dotted lines in Figure 3, the knob 10 extending well above the top of the case. To lock the brake the lever 21 is moved to " on " position the lower end of bolt 3 being in register with an opening 18 in the sector 17; pressure on knob 10 moves bolt downward the flared shoulder 1 spreading the dogs 2 apart and seating in the lowermost pair of notches 5 the springs 6 forcing the dogs toward each other; the spring 7 is compressed and the lower end of bolt 3 projects through the sector 17 securely locking the brake in set position.

To unlock, the key shown in Figure 8 is inserted in opening 11 and turned whereupon the wards 40 pressing against the grooved lugs 12, which action spreads the dogs 2 apart, releasing the shoulder 1 from notches 5, the spring 7 expanding and forcing the bolt upwardly and out of the opening 18 in sector 17. By again pressing on knob 10 and partially compressing spring 7 the bolt 3 when released, moves into the uppermost notches 5 and is held there by the dogs 2 being forced back to original position by the springs 6, and the device is in unlocked position, ready for the next operation.

In Figures 1, 2 and 3, the device is shown used in connection with an emergency brake lever, but as it is obvious that it may be used with any other control member, I have shown it applied to the ordinary foot brake of an automobile.

To adapt my improvement to such foot brake, the foot brake lever 29 is provided with a series of holes 33, and to the foot board of the car an angle bracket 23 is secured by holes 25 on the rear motor casing, or by holes 24; the holes 33 in lever 29 are so arranged that the device will lock when given different pressures. The bracket 23 is provided with a slot 32 through which foot lever 29 works. 28 indicates the gear shift lever. As the operation of the lock is the same in this type of device as in first described brake further description is deemed unnecessary, as the application will be perfectly obvious.

Having thus described my invention I claim:

1. A lock for a movable brake lever comprising in combination a casing adapted to be mounted on an automobile, a bolt slidably mounted in said casing, said bolt having an annular collar adjacent one end and a flared shoulder adjacent its other end, a spring surrounding said bolt and bearing at one end against said collar and at its other against the casing, spring actuated opposing dogs mounted in said casing, the opposing faces of said dogs longitudinally grooved to enclose the body portion of said bolt, and having beveled transverse notches across said grooves adapted to receive and hold said flared shoulder, said dogs adapted to be engaged and spread apart by a key.

2. A locking device as set forth in claim 1, and characterized by providing the opposing dogs with lateral lugs the opposing faces thereof having longitudinal grooves to receive the wards of a key whereby on turning the key the dogs will be spread apart to release the bolt.

FRANK H. KAGARISE.